(12) United States Patent
Oestergren (10) Patent No.: US 9,409,550 B2
(45) Date of Patent: Aug. 9, 2016

(54) VEHICLE WINDOW SPRAYING NOZZLE ARRANGEMENT

(71) Applicant: ILLINOIS TOOL WORKS INC., Glenview, IL (US)

(72) Inventor: Kristian Albert Oestergren, Alingsas (SE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 135 days.

(21) Appl. No.: 14/344,769

(22) PCT Filed: Sep. 25, 2012

(86) PCT No.: PCT/US2012/057059
§ 371 (c)(1),
(2) Date: Mar. 13, 2014

(87) PCT Pub. No.: WO2013/049028
PCT Pub. Date: Apr. 4, 2013

(65) Prior Publication Data
US 2014/0367487 A1  Dec. 18, 2014

(30) Foreign Application Priority Data
Sep. 27, 2011 (SE) .................................. 1130091

(51) Int. Cl.
*B60S 1/52*  (2006.01)
*B60S 1/48*  (2006.01)
*B60S 5/00*  (2006.01)

(52) U.S. Cl.
CPC .. *B60S 1/52* (2013.01); *B60S 1/488* (2013.01); *B60S 5/00* (2013.01); *Y10T 29/49826* (2015.01)

(58) Field of Classification Search
CPC .................................. B60S 1/488; B60S 1/52
USPC ........................................................ 239/284.1
See application file for complete search history.

(56) References Cited

U.S. PATENT DOCUMENTS 4,212,425 A * 7/1980 Schlick ...................... B05B 1/24
137/341
5,163,619 A * 11/1992 Wada ........................ B60S 1/52
239/284.1

(Continued)

FOREIGN PATENT DOCUMENTS

DE      4303113 A1   8/1994
DE     19958196 A1   6/2001

(Continued)

OTHER PUBLICATIONS

ISR for PCT/US2012/057059 mailed Nov. 7, 2012.

*Primary Examiner* — Len Tran
*Assistant Examiner* — Alexander Valvis
(74) *Attorney, Agent, or Firm* — Hauptman Ham, LLP (57) ABSTRACT

The present invention relates to a vehicle window spraying nozzle arrangement comprising a first feeder arranged for feeding window fluid and a nozzle head for dispensing window fluid towards a window when mounted. The nozzle head being arranged to be mounted to a vehicle body part with a first main surface facing towards the vehicle exterior and a second main surface facing towards the vehicle interior. The nozzle head is arranged to be connected to the first feeder. The assembled first feeder and the nozzle head are comprised in a spraying nozzle chain assembly which is arranged for mounting in a vehicle body part aperture in the vehicle body part from the second main surface towards the first main surface. The vehicle window spraying nozzle arrangement furthermore comprises a cover part arranged for mounting to said vehicle body part aperture from the first main surface towards the second main surface.

13 Claims, 5 Drawing Sheets

(56) References Cited

U.S. PATENT DOCUMENTS

| | | | | |
|---|---|---|---|---|
| 6,074,078 A | * | 6/2000 | Georgeff | B60Q 1/302 |
| | | | | 222/113 |
| 6,113,006 A | * | 9/2000 | Walker | B60S 1/52 |
| | | | | 239/284.1 |
| 6,305,618 B1 | * | 10/2001 | Lin | B60Q 1/2684 |
| | | | | 239/17 |
| 6,626,377 B1 | | 9/2003 | Vogt | |
| 2004/0188541 A1 | * | 9/2004 | Maruyama | B60S 1/481 |
| | | | | 239/284.1 |
| 2005/0252995 A1 | * | 11/2005 | Westphal | F16L 37/098 |
| | | | | 239/532 |
| 2008/0142619 A1 | | 6/2008 | Kim | |
| 2010/0084844 A1 | | 4/2010 | Dringenberg | |

FOREIGN PATENT DOCUMENTS

| | | | | |
|---|---|---|---|---|
| DE | 102005036016 | * | 2/2007 | B60S 1/52 |
| DE | 102005036016 A1 | | 2/2007 | |
| DE | 102009006888 A1 | | 8/2010 | |
| JP | 57-165270 U | | 10/1982 | |
| JP | H0173070 U | | 5/1989 | |

* cited by examiner

VEHICLE WINDOW SPRAYING NOZZLE ARRANGEMENT

RELATED APPLICATIONS

The present application is National Phase of International Application Number PCT/US2012/057059 filed Sep. 25, 2012, which claims priority to Swedish Application Number 1130091-0 filed Sep. 27, 2011.

TECHNICAL FIELD

The present invention relates to a vehicle window spraying nozzle arrangement which comprises a first feeder arranged for feeding window fluid and a nozzle head. The nozzle head is arranged to be mounted to a vehicle body part, where the vehicle body part has a first main surface facing towards the vehicle exterior and a second main surface facing towards the vehicle interior. The nozzle head comprises at least a first connection arranged for being connected to the first feeder when mounted. The nozzle head further comprises at least one nozzle head aperture arranged for dispensing window fluid towards a window when mounted and connected to said feeder.

The present invention also relates to a method for mounting a vehicle window spraying nozzle arrangement to a vehicle body part. The vehicle body part has a first main surface facing towards the vehicle exterior and a second main surface facing towards the vehicle interior.

BACKGROUND

Today vehicles have some sort of window spraying arrangement in order to spray a cleaning fluid onto the window. After the spraying, window wipers normally wipe the cleaning fluid away together with dirt and stains that have been dissolved by means of the cleaning fluid. Such a window spraying arrangement is in particular used for the windscreen and optionally for the rear window.

Although these are commonly used devices, a desire for improvements still exists.

SUMMARY

When mounting window spraying arrangement during assembly of the vehicle at the vehicle factory production line, a spray nozzle for the windscreen is normally first fitted to the upper side of the hood, and a hose for directing the cleaning fluid from a cleaning fluid pump is thereafter fitted to the spray nozzle from the underside of the hood. Optionally, an electrical connection for defrosting purposes may also be connected to the spray nozzle from the underside of the hood.

However, this mounting method is complicated and time-consuming, Furthermore, the material needed for the spray nozzle to withstand the different kind of cleaning fluids used, prevents painting of the spray nozzle in a desired color, such as the same color as the color of the hood.

The object of the present invention is to provide a vehicle window spraying nozzle arrangement which is easily assembled and allows painting of the visible part of the vehicle window spraying nozzle arrangement on the upper side of the hood.

This object is obtained by means of a vehicle window spraying nozzle arrangement which comprises a first feeder arranged for feeding window fluid and a nozzle head. The nozzle head is arranged to be mounted to a vehicle body part, where the vehicle body part has a first main surface facing towards the vehicle exterior and a second main surface facing towards the vehicle interior. The nozzle head comprises at least a first connection arranged for being connected to the first feeder when mounted. The nozzle head further comprises at least one nozzle head aperture arranged for dispensing window fluid towards a window when mounted and connected to said feeder.

The assembled first feeder and the nozzle head are comprised in a spraying nozzle chain assembly, where the spraying nozzle chain assembly is arranged for mounting in a vehicle body part aperture in the vehicle body part from the second main surface towards the first main surface such that at least a part of the nozzle head protrudes through the vehicle body part aperture. The vehicle window spraying nozzle arrangement furthermore comprises a cover part arranged for mounting to said vehicle body part aperture from the first main surface towards the second main surface such that the part of the mounted nozzle head that protrudes through the vehicle body part aperture mainly is covered by the cover part.

The present invention also relates to a method for mounting a vehicle window spraying nozzle arrangement to a vehicle body part. The vehicle body part has a first main surface facing towards the vehicle exterior and a second main surface facing towards the vehicle interior. The method comprises the steps: Mounting at least a first feeder to a corresponding first connection in a nozzle head, the first feeder being used for feeding window fluid, the assembled first feeder and first connection being comprised in a spraying nozzle chain assembly; Mounting a cover part to a vehicle body part aperture in the vehicle body part, from the first main surface towards the second main surface; and Mounting the spraying nozzle chain assembly in said vehicle body part aperture from the second main surface towards the first main surface such that at least a part of the nozzle head protrudes through the vehicle body part aperture, said protruding part of the nozzle head mainly being covered by the cover.

According to an example, the nozzle head comprises a second connection arranged for being connected to a second feeder used for feeding electric power to a heating device (functionally depicted in FIG. 2 by way of black-box format as element 44) comprised in the nozzle head. The assembled second feeder and the nozzle head are comprised in the spraying nozzle chain assembly.

According to another example, the cover part is manufactured in a material that is suited for painting with car exterior paint. Preferably, the nozzle head is manufactured in a different material which is adapted to withstand the chemical properties of the window fluid.

According to another example, the nozzle head comprises a first nozzle head locking part in the form of a resilient spring rod and a second nozzle head locking part in the form of a resilient rod. During assembly, firstly the second nozzle head locking part is arranged to engage a corresponding clip aperture comprised in a clip, which clip in turn is comprised in the cover part, and secondly the first nozzle head locking part is arranged to actuate a retaining spring force against a first clip comprised in the cover part.

Other examples are disclosed in the dependent claims.

A number of advantages are obtained by means of the present invention. For example:

Uncomplicated assembly;
Fewer separate parts;
The responsibility of the mounting not lying with the vehicle factory personnel; and
Allows use of painted cover.

DRAWINGS

The present invention will now be described more in detail with reference to the appended drawings, where.

DETAILED DESCRIPTION

Figure 1:
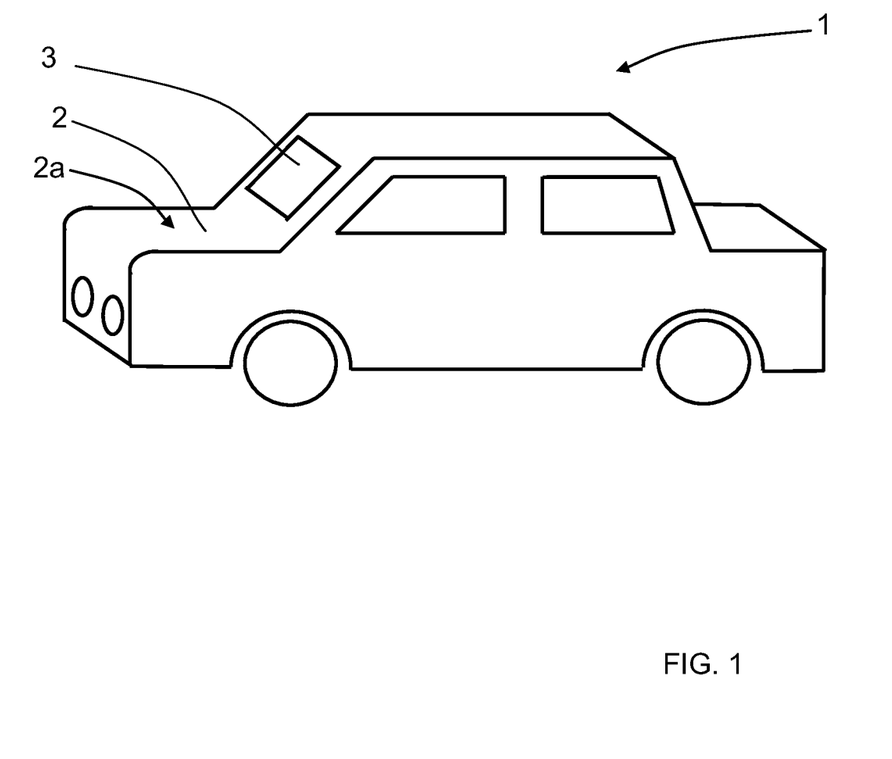
FIG. 1 shows a schematic perspective view of a vehicle where the present invention is used.
Figure 2:
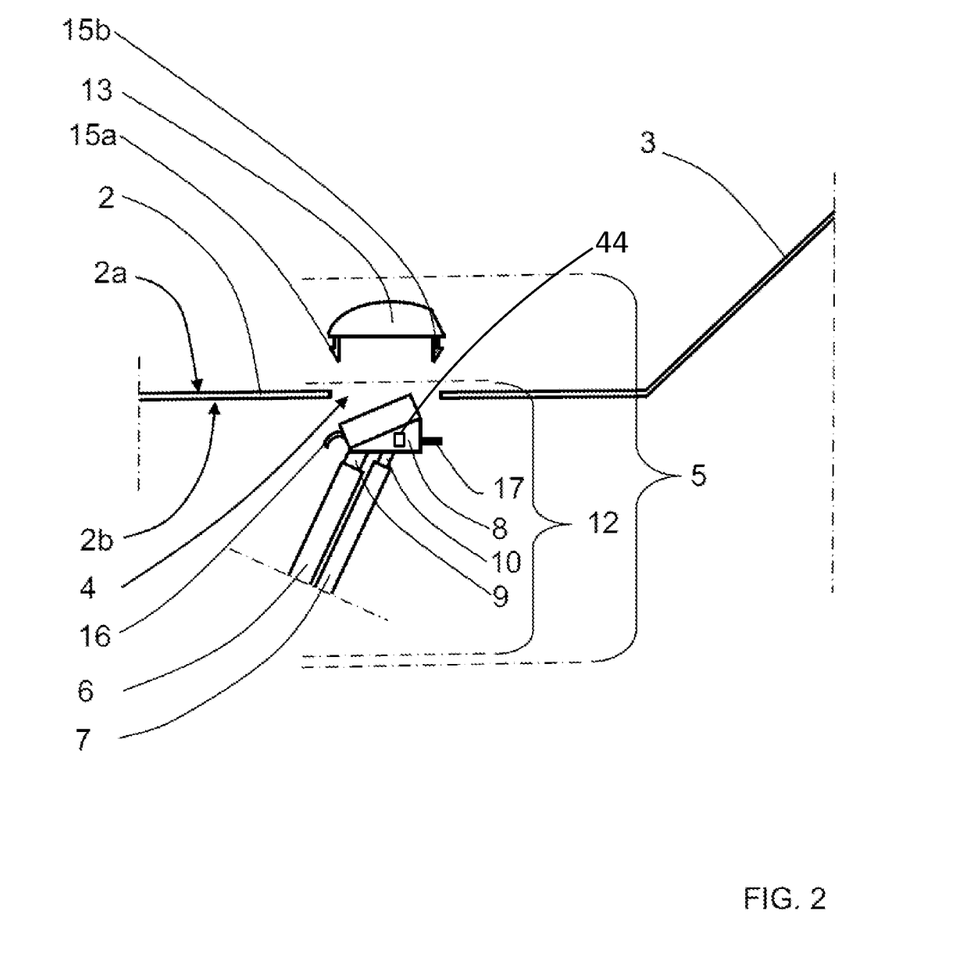
FIG. 2 shows a schematic cut-open side view of a spraying nozzle chain assembly and cover part before being mounted to a vehicle hood.
Figure 3:
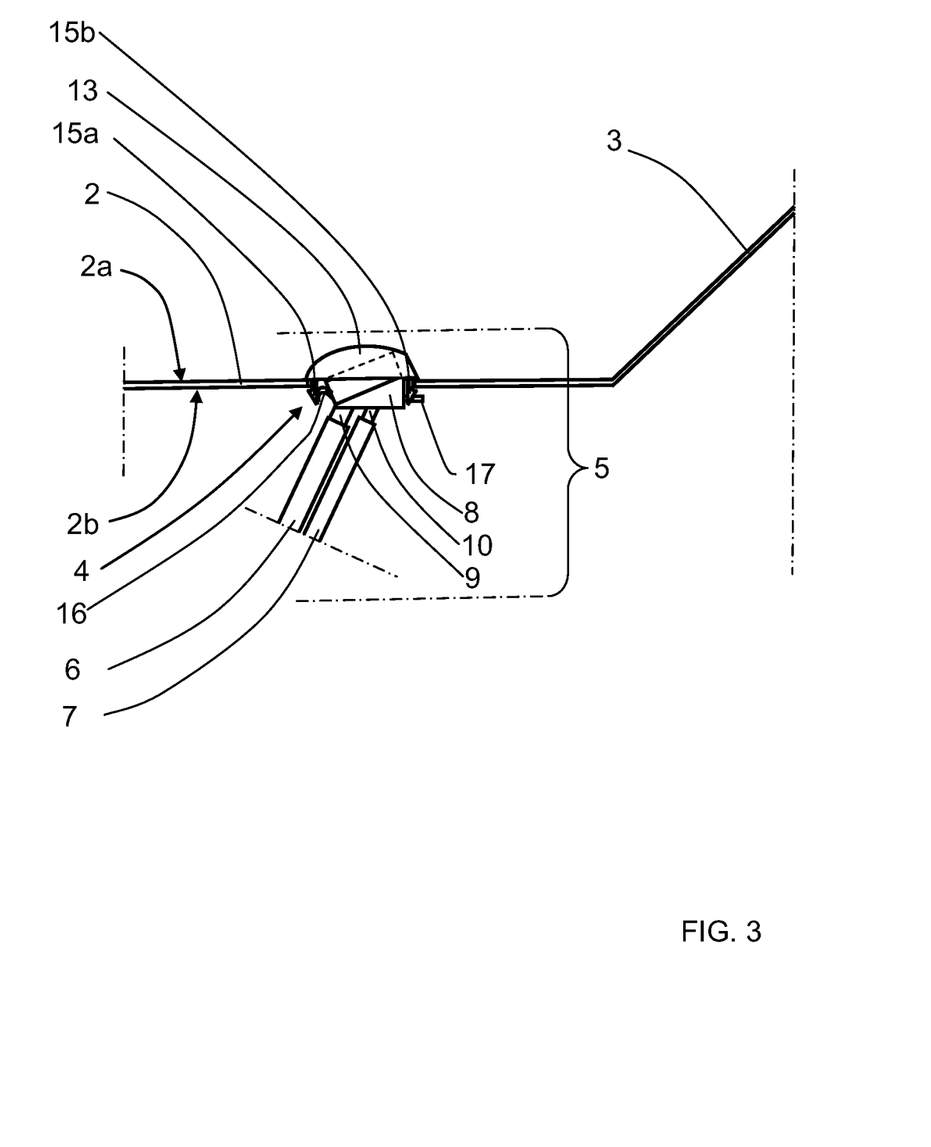
FIG. 3 shows a schematic cut-open side view of a spraying nozzle chain assembly and cover part after having been mounted to a vehicle hood.

With reference to FIG. 1, a vehicle 1 comprises a hood 2 and a windscreen 3. With reference also to FIG. 2 and FIG. 3, the hood has a first main surface 2a facing towards the vehicle exterior and a second side 2b facing towards the vehicle interior. The hood comprises a first hood aperture 4.

A vehicle window spraying nozzle arrangement 5 comprises a first feeder 6 for window fluid, a second feeder 7 for electric power and a nozzle head 8. The nozzle head 8 comprises a first connection 9 arranged for being connected to the first feeder 6 and a second connection 10 arranged for being connected to the second feeder 7.

The nozzle head further comprises a first nozzle head aperture 11a and a second nozzle head aperture 11b, each nozzle head aperture 11a, 11b being arranged to dispense window cleaning fluid towards the windscreen 3.

The first feeder 6 runs to a container for window cleaning fluid and an associated pump (not shown), the pump being arranged for directing window cleaning fluid to the nozzle head and the nozzle head apertures 11a, 11b via the a first feeder 6 and the first connection 9. Thus, when the first connection 9 is connected to the first feeder 6 and the pump directs window cleaning fluid to the nozzle head apertures 11a, 11b, the window cleaning fluid is sprayed out from the nozzle head apertures 11a, 11b. When the vehicle window spraying nozzle arrangement is mounted, the window cleaning fluid is sprayed towards the windscreen 2.

According to the present invention, the assembled first feeder 6 and first connection 9, and second feeder 7 and second connection 10, are comprised in a spraying nozzle chain assembly 12. The spraying nozzle chain assembly 12 is arranged for mounting in the first hood aperture 4 in the hood 3 from the second main surface 2b towards the first main surface 2a, such that at least a part of the nozzle head 8 protrudes through the first hood aperture 4.

The vehicle window spraying nozzle arrangement 5 furthermore comprises a cover part 13 arranged for mounting to the first hood aperture 4 from the first main surface 2a towards the second main surface 2b such that the part of the mounted nozzle head 8 that protrudes through the first hood aperture 4 is covered by the cover part 13.

The cover part 13 comprises a first cover aperture 14a and a second cover aperture 14b. The cover apertures 14a, 14b are arranged to correspond to the nozzle head apertures 11a, 11b when assembled such that the cover part 13 allows the nozzle head apertures 11a, 11b to dispense window cleaning fluid towards the windscreen 3.

The cover part comprises a first clip 15a and a second clip 15b, the clips 15a, 15b being arranged on opposing sides of the cover part 13 and extending towards the second main surface 2b from the first main surface 2a. When the cover part 13 is mounted, it is secured to the hood 2 by means of the clips 15a, 15b which engage parts of the edge of the first hood aperture 4 as shown in FIG. 3.

Furthermore, with reference to FIG. 2, FIG. 3, FIG. 4 and FIG. 5, the nozzle head 8 comprises a first nozzle head locking part 16 in the form of a resilient spring rod and a second nozzle head locking part 17 in the form of a rod. When mounted, the first nozzle head locking part 16 actuates a retaining spring force against the first clip 15a and the second nozzle head locking part 17 engages a corresponding clip aperture 18 comprised in the second clip 15b. The first clip 15a and the clip aperture 18 generally constitute cover locking parts.

During mounting, the second nozzle head locking part 17 is firstly inserted into the clip aperture 18, and secondly the first nozzle head locking part 16 is brought in such a position that it actuates a retaining spring force against the first clip 15a. Preferably, not shown in the Figures, there is an indent, a ridge or an aperture in the first clip 15a, providing a locking rest for the first nozzle head locking part 16, enhancing the locking of the assembly. When locking parts 16, 17; 15a, 18 according to the above are used, the cover part 3 is preferably mounted in the hood aperture 3 before the spraying nozzle chain assembly 12 is mounted.

By means of the present invention, the cover part 13 may be manufactured in a material that is suited for being painted with car exterior paint, while the nozzle head 8 is manufactured in a different material that withstands the chemical properties of the window cleaning fluid. This is an advantage of the present invention, since a material that withstands the chemical properties of the window cleaning fluid normally is unsuitable for being painted with car exterior paint. In this way, the visible part of the vehicle window spraying nozzle arrangement 5, i.e. the cover part 13, may be painted in the same color as the hood.

Furthermore, the assembly of the vehicle window spraying nozzle arrangement 5 is easily performed, all parts but the cover part 13 being pre-assembled in the form of the spraying nozzle chain assembly 12 and inserted into the hood aperture 4 from below the hood 2. Then the cover part 13 is easily inserted over the nozzle head 8. Alternatively, the cover part 13 is first fixed into the hood aperture 4, and then the nozzle head 8 is fastened, as described above using the nozzle head locking parts 16, 17.

The present invention also relates to a method for mounting vehicle a window spraying nozzle arrangement 5 to a vehicle body part, such as the hood 2, the vehicle body part 2 having a first main surface 2a facing towards the vehicle exterior and a second main surface facing 2b towards the vehicle interior, where the method at least comprises the steps:

Mounting at least a first feeder 6 to a first connection 9 in a nozzle head 8, the first feeder 6 being used for feeding window fluid, the assembled first feeder 6 and first connection 9 being comprised in a spraying nozzle chain assembly 12.

Mounting a cover part 13 to a vehicle body part aperture 4, such as a hood aperture 4, in the vehicle body part 2 from the first main surface 2a towards the second main surface 2b.

Mounting the spraying nozzle chain assembly 12 in said vehicle body part aperture 4 from the second main surface 2b towards the first main surface 2a such that at least a part of the nozzle head 8 protrudes through the vehicle body part aperture 4, said protruding part of the nozzle head 8 mainly being covered by the cover 13.

Figure 4:
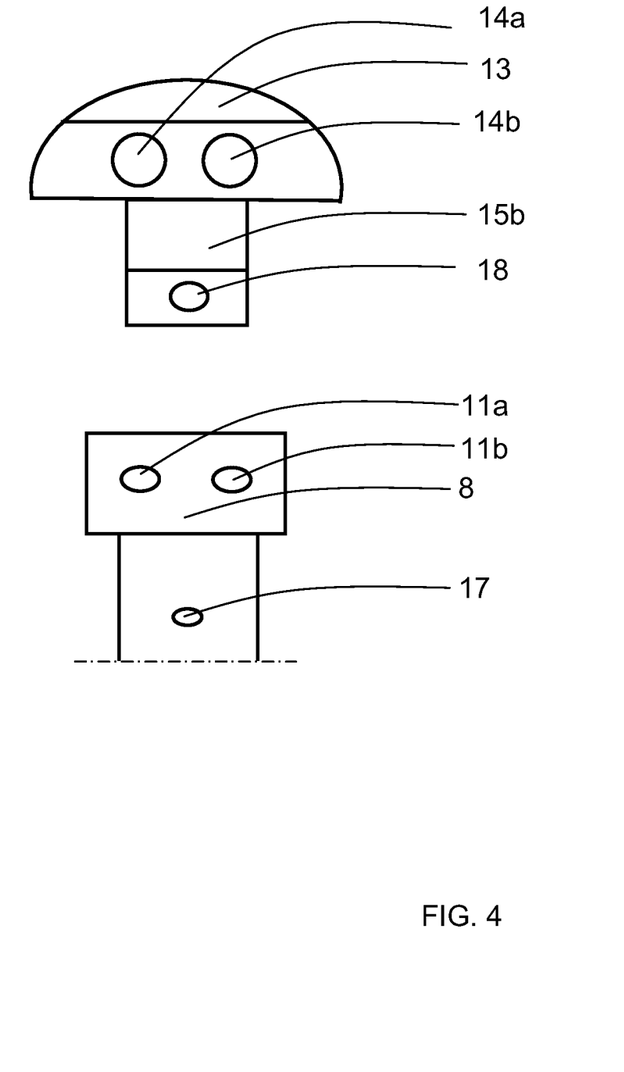
FIG. 4 shows a schematic front view of a nozzle head and cover part before being mounted to each other.
Figure 5:
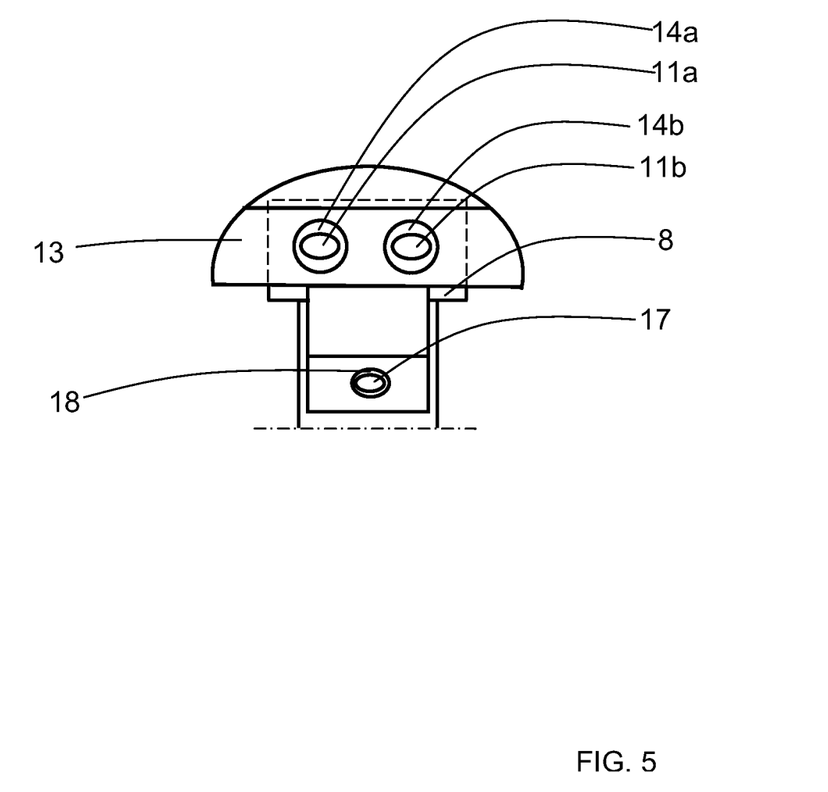
FIG. 5 shows a schematic front view of a nozzle head and cover part after having been mounted to each other.

Preferably, the method also comprises mounting of the nozzle head 8 to the cover part 13, where at least one nozzle head locking part 16, 17 is brought to engage at least one corresponding cover locking part 15a, 18. Advantageously, according to an example of such a mounting, the second nozzle head locking part 17 is inserted into a first cover locking part in the form of a clip aperture 18 and the first nozzle head locking part 16 is brought to such a position that it actuates a retaining spring force against a cover locking part in the form of a first clip 15a.

The present invention is not limited to the described examples above, but may vary freely within the scope of the dependent claims. The vehicle window spraying nozzle arrangement 5 may be used at any vehicle widow, for example a vehicle rear window, where the hood 2 generally is constituted by any suitable vehicle body part 2 and where the hood aperture 4 generally is constituted by a vehicle body part aperture 4.

The number of vehicle body part apertures 4 may vary, for the windscreen the number of vehicle body part apertures is normally two or three, additionally requiring a second hood aperture and optionally a third hood aperture (not shown), while for the rear window the number of vehicle body part apertures normally is one.

The locking parts 16, 17; 15a, 18 may be of any suitable kind and made in any suitable material, those described only being an example of locking parts that provide an enhanced fastening of the spraying nozzle chain assembly 12. It is of course conceivable to dispense with locking parts of the kinds described, instead the spraying nozzle chain assembly 12 may be press-fitted into the aperture 4 and/or glued to the edge of the aperture 4.

The clips 15a, 15b may also be dispensed with, the cover part 13 instead being press-fitted into the aperture 4 and/or glued to the edge of the aperture 4.

The number of cover apertures 14a, 14b and nozzle head apertures 11a, 11b may vary between different nozzle heads, of course there should be at least one. Also, the number and positions of cover apertures 14a, 14b and nozzle head apertures 11a, 11b should correspond between assembly of nozzle head 8 and cover part 13 such that an optimal spraying of the window in question is obtained.

The window cleaning fluid may be any sort of suitable window fluid.

The first feeder 6 for window fluid is normally constituted by a plastic hose or rubber hose, and the second feeder 7 for electric power is normally constituted by an electric wire, possibly surrounded by a protective cover or tubing. The associated first connection 9 and second connection 10 may be of any suitable kind. The first connection 9 may be a flange, where the first feeder 6 either is mounted around the first connection. or within the first connection 9. The first connection 9 may also be in the form of an aperture in the nozzle head 8, into which the first feeder 6 is inserted. The second connection 10 may be any type of electrical connector, preferably sealed when mounted.

The cover part 13 may comprise a sealing arranged to constitute a sealing between the cover part 13 and the vehicle body part 2, the sealing being intended to prevent moisture and objects, such as dust and dirt, to penetrate through the vehicle body part aperture 4.

The invention claimed is:

1. A vehicle window spraying nozzle arrangement comprising a first feeder arranged for feeding window fluid and a nozzle head, the nozzle head being arranged to be mounted to a vehicle body part of a vehicle, the vehicle body part having a first main surface facing towards a vehicle exterior and a second main surface facing towards a vehicle interior, the nozzle head comprising at least a first connection arranged for being connected to the first feeder when mounted, the nozzle head further comprising at least one nozzle head aperture arranged for dispensing window fluid towards a window when mounted and connected to said first feeder, wherein the assembled first feeder and the nozzle head are comprised in a spraying nozzle chain assembly, the spraying nozzle chain assembly being arranged for mounting in a vehicle body part aperture in the vehicle body part from the second main surface towards the first main surface such that at least a part of the nozzle head protrudes through the vehicle body part aperture, where the vehicle window spraying nozzle arrangement furthermore comprises a cover part arranged for mounting to said vehicle body part aperture from the first main surface towards the second main surface such that the part of the mounted nozzle head that protrudes through the vehicle body part aperture substantially is covered by the cover part, wherein the nozzle head comprises at least one nozzle head locking part and that the cover part comprises at least one corresponding cover locking part, where said corresponding locking parts are arranged to engage each other when the nozzle head and the cover are mounted, and the nozzle head comprises a first nozzle head locking part and a second nozzle head locking part, where during assembly firstly the second nozzle head locking part is arranged to be inserted into a corresponding clip aperture comprised in a clip, which the clip in turn is comprised in the cover part, and secondly the first nozzle head locking part is arranged to actuate a retaining spring force against a first clip comprised in the cover part.

2. A vehicle window spraying nozzle arrangement according to claim 1, wherein the nozzle head comprises a second connection arranged for being connected to a second feeder, where the assembled second feeder and the nozzle head are comprised in the spraying nozzle chain assembly, the second feeder being arranged for feeding electric power to a heating device comprised in the nozzle head.

3. A vehicle window spraying nozzle arrangement according to claim 1, wherein that the cover part comprises at least one cover aperture being arranged to correspond to said nozzle head aperture such that when assembled, the cover part allows said nozzle head aperture to dispense window fluid towards a window.

4. A vehicle window spraying nozzle arrangement according to claim 1, wherein the cover part is manufactured in a material that is suited for painting with vehicle exterior paint, where the nozzle head is manufactured in a different material.

5. A vehicle window spraying nozzle arrangement according to claim 1, wherein the first nozzle head locking part is in the form of a resilient spring rod and the second nozzle head locking part is in the form of a resilient rod.

6. A method for mounting a vehicle window spraying nozzle arrangement a vehicle body part of a vehicle, the vehicle body part having a first main surface facing towards a vehicle exterior and a second main surface facing towards a vehicle interior, wherein the method comprises the actions:

mounting at least a first feeder to a corresponding first connection in a nozzle head, the first feeder being used for feeding window fluid, the assembled first feeder and first connection being comprised in a spraying nozzle chain assembly;

mounting a cover part to a vehicle body part aperture in the vehicle body part, from the first main surface towards the second main surface; and mounting the spraying nozzle chain assembly in said vehicle body part aperture from the second main surface towards the first main surface such that at least a part of the nozzle head protrudes through the vehicle body part aperture, wherein as a result of the mounting of the cover part to the vehicle body part aperture and the mounting of the spraying nozzle chain assembly in said vehicle body part aperture, said protruding part of the nozzle head is mainly covered by the cover, wherein the method also comprises mounting of the nozzle head to the cover part, said mounting comprising the action of engaging at least one nozzle head locking part with at least one corresponding cover locking part, and the mounting of the nozzle head to the cover part comprises the actions:

inserting the second nozzle head locking part into a first cover locking part in the form of a clip aperture; and bringing the first nozzle head locking part in such a position that it actuates a retaining spring force against a cover locking part in the form of a first clip.

7. A method according to claim 6, wherein the method also comprises the step of mounting a second feeder to a second connection in the nozzle head before the spraying nozzle chain assembly is mounted to the vehicle body part, the second feeder being used for feeding electric power to a heating device in the nozzle head.

8. A vehicle window spraying nozzle arrangement comprising:

a first feeder arranged for feeding window fluid and;

a nozzle head, wherein the nozzle head is configured to be mounted to a vehicle body part of a vehicle, the vehicle body part having a first main surface facing towards a vehicle exterior and a second main surface facing towards a vehicle interior, the nozzle head comprising at least a first connection arranged for being connected to the first feeder when mounted, the nozzle head further comprising at least one nozzle head aperture arranged for dispensing window fluid towards a window when mounted and connected to said first feeder, the assembled first feeder and the nozzle head are in a spraying nozzle chain assembly, the spraying nozzle chain assembly being configured to be mounted in a vehicle body part aperture in the vehicle body part from the second main surface towards the first main surface such that at least a part of the nozzle head protrudes through the vehicle body part aperture, and the vehicle window spraying nozzle arrangement furthermore comprises a cover part arranged for mounting to said vehicle body part aperture from the first main surface towards the second main surface such that the part of the mounted nozzle head that protrudes through the vehicle body part aperture substantially is covered by the cover part, wherein the nozzle head comprises at least one nozzle head locking part and that the cover part comprises at least one corresponding cover locking part, where said corresponding locking parts are arranged to engage each other when the nozzle head and the cover are mounted; and the nozzle head comprises a first nozzle head locking part in the form of a resilient spring rod and a second nozzle head locking part in the form of a resilient rod, where during assembly firstly the second nozzle head locking part is arranged to be inserted into a corresponding clip aperture comprised in a clip, which the clip in turn is comprised in the cover part, and secondly the first nozzle head locking part is arranged to actuate a retaining spring force against a first clip comprised in the cover part.

9. A vehicle window spraying nozzle arrangement according to claim 8, wherein the nozzle head comprises a second connection arranged for being connected to a second feeder, where the assembled second feeder and the nozzle head are comprised in the spraying nozzle chain assembly, the second feeder being arranged for feeding electric power to a heating device comprised in the nozzle head.

10. A vehicle window spraying nozzle arrangement according to claim 8, wherein the cover part is manufactured in a material that is suited for painting with vehicle exterior paint, where the nozzle head is manufactured in a different material.

11. A vehicle window spraying nozzle arrangement according to claim 8, characterized in that the nozzle head comprises at least one nozzle head locking part and that the cover part comprises at least one corresponding cover locking part, where said corresponding locking parts are arranged to engage each other when the nozzle head and the cover are mounted.

12. A vehicle, comprising:

the window spraying nozzle arrangement according to claim 1.

13. A vehicle window spraying nozzle arrangement according to claim 8, wherein the cover part is manufactured in a material that is suited for painting with vehicle exterior paint, where the nozzle head is manufactured in a different material.

* * * * *